US011813650B1

(12) United States Patent
Alexander

(10) Patent No.: US 11,813,650 B1
(45) Date of Patent: Nov. 14, 2023

(54) MULTIPURPOSE DEVICES AND METHODS FOR SEALING, MEASURING, AND SURGING FLUIDS IN CASINGS

(71) Applicant: Alexander Innovations, LLC, Chapel Hill, NC (US)

(72) Inventor: W. Joseph Alexander, Chapel Hill, NC (US)

(73) Assignee: Alexander Innovations, LLC, Chapel Hill, NC (US)

( * ) Notice: Subject to any disclaimer, the term of this patent is extended or adjusted under 35 U.S.C. 154(b) by 0 days.

(21) Appl. No.: 17/559,138

(22) Filed: Dec. 22, 2021

Related U.S. Application Data

(60) Provisional application No. 63/129,100, filed on Dec. 22, 2020.

(51) Int. Cl.
*B09C 1/00* (2006.01)
*C02F 1/28* (2023.01)
*E03B 3/18* (2006.01)
*C02F 103/06* (2006.01)

(52) U.S. Cl.
CPC .............. *B09C 1/002* (2013.01); *C02F 1/28* (2013.01); *E03B 3/18* (2013.01); *C02F 2103/06* (2013.01); *C02F 2201/006* (2013.01)

(58) Field of Classification Search
CPC . B09C 1/002; B09C 1/007; C02F 1/00; C02F 1/001; C02F 1/008; C02F 1/28; C02F 1/52; C02F 9/00; C02F 9/005; C02F 2103/06; C02F 2201/00; C02F 2201/002; C02F 2201/004; C02F 2201/006; C02F 2201/007; C02F 2201/005; C02F 2209/00; C02F 2209/40; C02F 2301/02; C02F 2301/022; C02F 2203/006; G01F 15/14; G01F 15/12; G01F 25/20; B01L 99/00; B01L 2300/049; B01L 2300/046; B01L 2300/04
See application file for complete search history.

(56) References Cited

U.S. PATENT DOCUMENTS 9,937,537 B2   4/2018   Alexander et al.
10,556,260 B2   2/2020   Alexander et al.

*Primary Examiner* — Magali P Slawski
*Assistant Examiner* — Bernadette Karen McGann
(74) *Attorney, Agent, or Firm* — NK Patent Law

(57) ABSTRACT

The present disclosure relates to a multipurpose casing device (MCD) which controls fluid flow in a filter casing for the primary purpose of directing contaminated fluid (e.g., groundwater) to contact treatment media inside a fluid-treatment cartridge by sealing off an annular space between the filter casing and the cartridge. The MCD assembly also permits hydraulic testing of the integrity of a barrier wall attached to a filter casing by sealing off an inlet or an outlet screen of a filter casing. The MCD assembly allows measurements of physical or chemical properties of a fluid at a specific elevation in a filter casing using hollow core tools connected to an MCD. The MCD can further be used to surge fluids through inlet and/or outlet screens of filter casing that may need to be periodically cleaned.

6 Claims, 18 Drawing Sheets

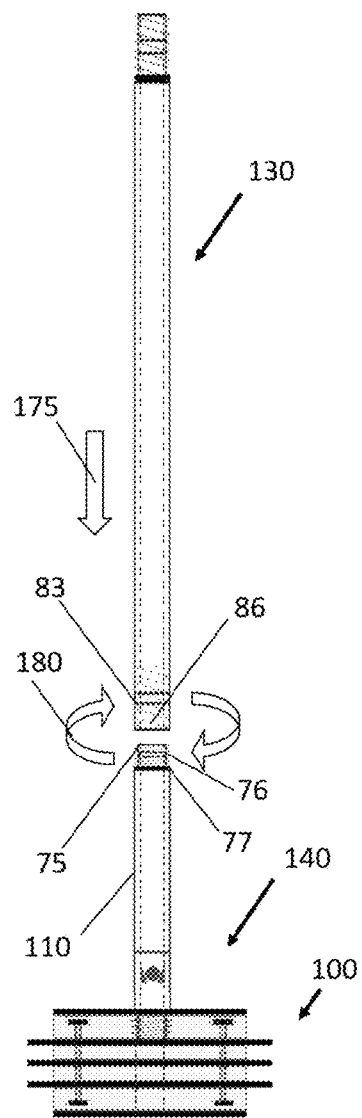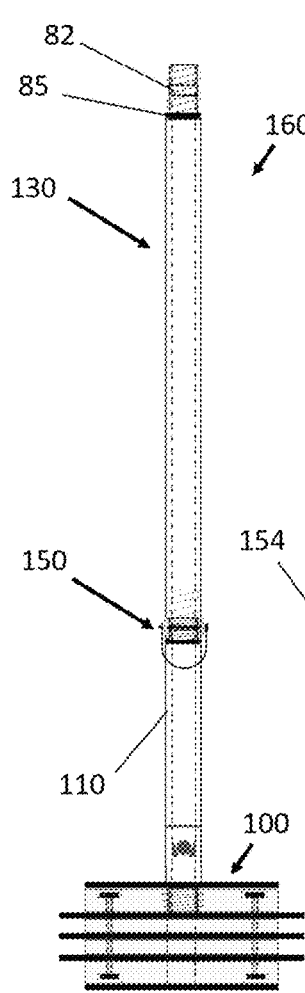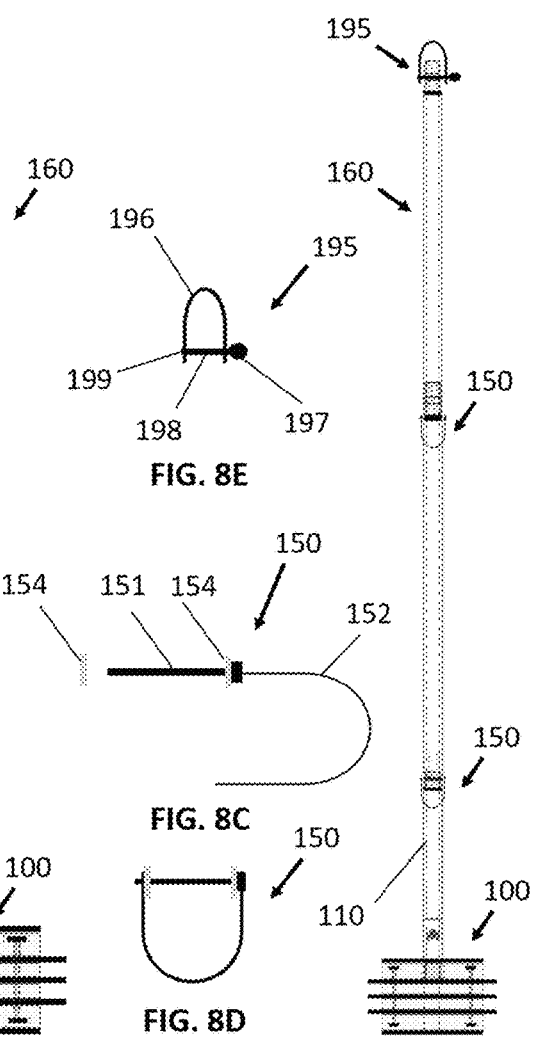
FIG. 8A  FIG. 8B  FIG. 8C  FIG. 8D  FIG. 8E  FIG. 8F

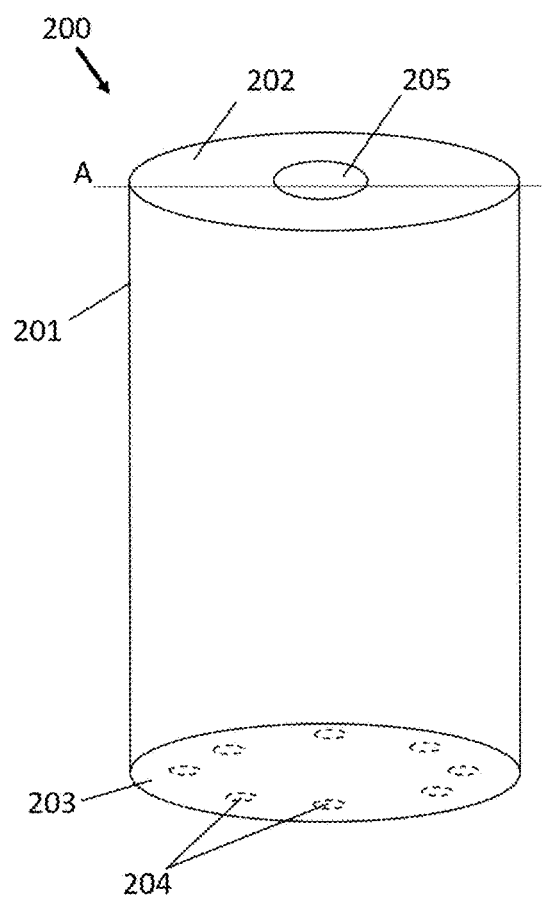
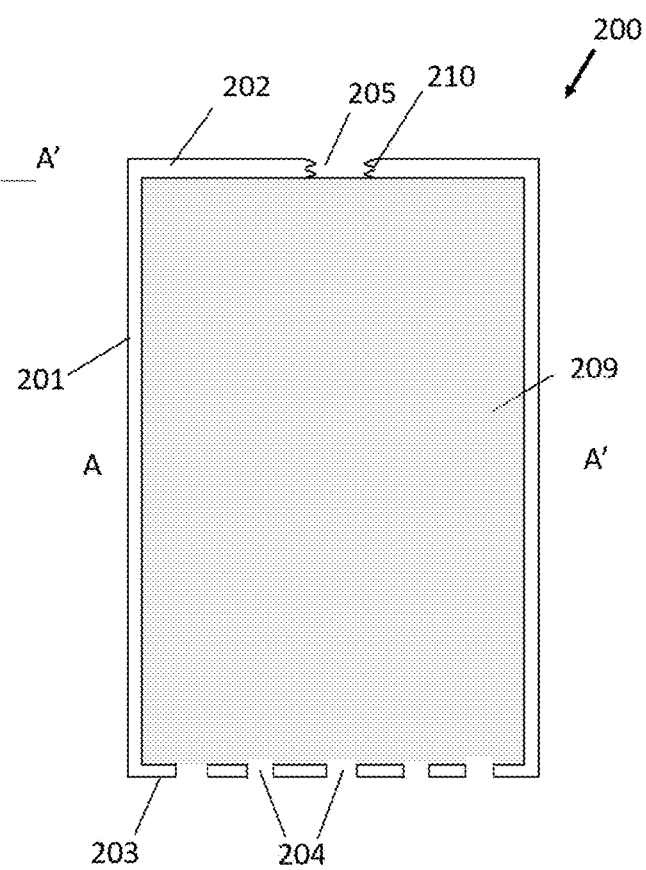
FIG. 9A
FIG. 9B

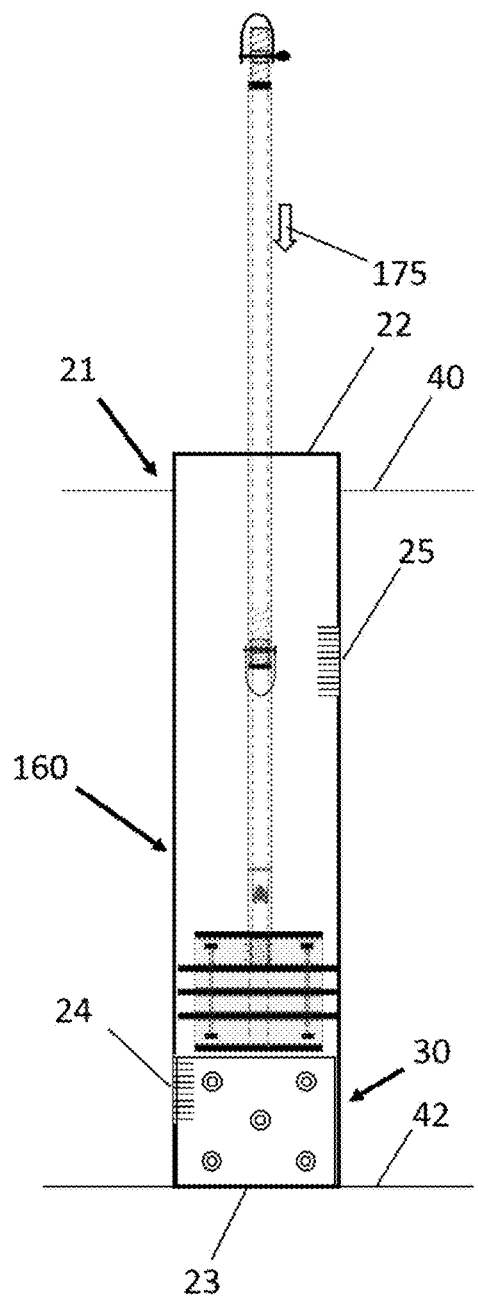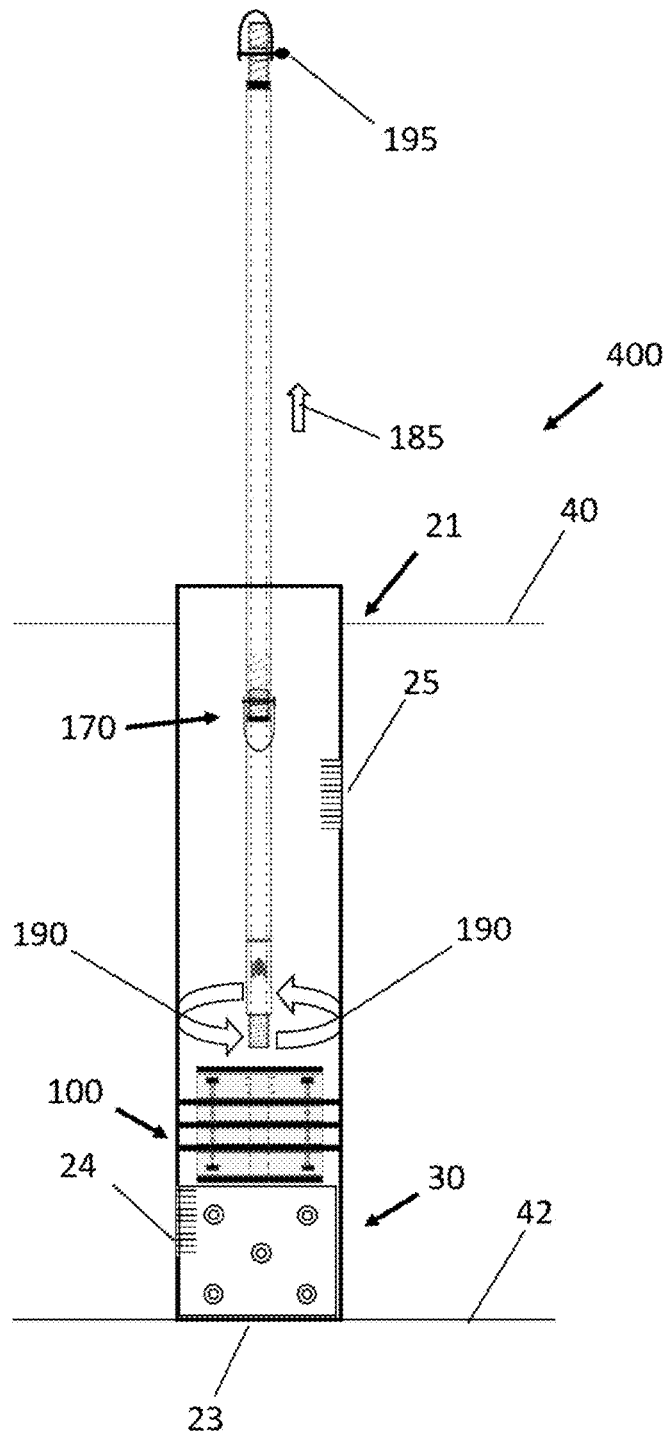
FIG. 13A  FIG. 13B

MULTIPURPOSE DEVICES AND METHODS FOR SEALING, MEASURING, AND SURGING FLUIDS IN CASINGS

CROSS-REFERENCE TO RELATED APPLICATIONS

This application claims priority to U.S. Provisional Patent Application No. 63/129,100 entitled "MULTIPURPOSE DEVICES AND METHODS FOR SEALING, MEASURING, AND SURGING FLUIDS IN CASINGS," filed on Dec. 22, 2020, the contents of which are incorporated by reference herein.

TECHNICAL FIELD

The present disclosure relates to multipurpose devices and methods for use in cylindrical casings installed in a subsurface environment. More particularly, the present disclosure relates to devices that can be positioned and operated in cylindrical casings for different purposes, such as 1) sealing off the flow of fluids that may enter a casing from an elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned. The apparatus is referred to in the present disclosure as a multipurpose casing device (MCD) or when components are added, an MCD assembly.

BACKGROUND

Relevant patents by the inventor (U.S. Pat. Nos. 9,937,537 B2 and 10,556,260 B2) are referenced in the present disclosure specifically with respect to a filter casing, an interconnected barrier wall, and a liquid treatment cartridge inside the filter casing. These three components are used in example applications of multipurpose casing devices (MCDs) and MCD assemblies described herein.

The inventor's prior art describes in detail a liquid treatment cartridge (generally referred to herein as a fluid treatment cartridge for a broader scope of the inventive subject matter, or a treatment cartridge, or simply a cartridge). The prior art describes placement of a treatment cartridge (with an outside diameter, for reference purposes only, of about 10-inches) in a filter casing (with an inside diameter, for reference purposes only, of about 11.25-inches) wherein an annular space is defined between an exterior of the cartridge casing and an interior of the structural wall of the filter casing (with an annular space, for reference purposes only, of about 0.625 inches, or about ⅝ of an inch, with variations occurring as a result of actual wall thicknesses for materials used). These dimensions are provided for general reference purposes only, and to provide context for the relatively large size of cartridges and casings associated with the prior art as compared to casings typically associated with groundwater monitoring wells (typically about 2 inches in diameter) and drilled groundwater supply wells (typically 4 to 8-inches in diameter).

A fluid treatment cartridge may have an inflatable seal that when in an inflated condition an annular space (i.e., typically about ⅝-inch diameter) is filled by the inflatable seal such that the treatment cartridge is engaged with the interior of the structural wall of the filter casing. When the inflatable seal is in a deflated condition the treatment cartridge is disengaged from the interior of the structural wall of the filter casing permitting the treatment cartridge to be placed within and removed from the structural wall of the filter casing. Tubing for inflating the pneumatic seal is either outside or inside the casing of the treatment cartridge and extends to the ground surface where the tubing is connected by various fittings and valves for filling the seal (with air, water, or other fluids) and a gage for monitoring pressure within the seal.

An MCD assembly could be used in one example to seal off the flow of fluids that may enter a large diameter filter casing from a known elevation for testing the hydraulic integrity of a barrier wall connected to both sides of the filter casing (e.g., to ensure that groundwater does not appreciably flow through the barrier wall). Once testing is complete, the MCD assembly could remain in place and integrated with an in-situ fluid-treatment cartridge (e.g., for treating contaminated groundwater entering the filter casing). Components connected to the MCD could also be used for measuring physical properties of a fluid at a specific elevation in a filter casing (e.g., measuring the hydrostatic head of groundwater) or sampling a fluid for chemical properties (e.g., obtaining a groundwater sample to assess the water quality from a discrete elevation). In another example, an MCD assembly could be used to surge fluids entering filter casings that have external openings (e.g., well screens, slots, or similar openings) that may periodically need to be cleaned (i.e., similar to processes that are sometimes used in developing water wells or monitoring wells where physical surging removes organic and inorganic material in the filter pack thereby increasing the rate of water movement from the aquifer into the well).

The applicant describes in detail the use of mechanical packer systems to seal an annular space between an exterior of a fluid treatment cartridge casing and an interior of the structural wall of the filter casing (Application No. 63/119,285 entitled Mechanical Packer Systems for Controlling Fluid Flow, filed with the U.S. Patent and Trademark Office on Nov. 30, 2020). Several embodiments of fluid treatment cartridges specifically for use with mechanical packer systems are described in Application No. 63/119,285, some of which are appropriate for use with MSD assemblies described in the present disclosure.

The MSD assembly described in the present disclosure may, in some circumstances, serve as an alternative to a mechanical packer system used in a filter casing, and/or external seals on a fluid treatment cartridge. Specifically, the MSD assembly is a simple tool that will be less expensive to manufacture than the mechanical packer systems described in Application No. 63/119,285. However, the mechanical packer system is anticipated to provide greater control of fluid flow which may be required under higher pressure applications such as those typically encountered at greater subsurface depths or for controlling fluid flow for long periods of time. The applicant's goal is to have multiple devices, apparatus, tools, and methods as appropriate for use with the systems described in the prior art (U.S. Pat. Nos. 9,937,537 B2 and 10,556,260 B2). However, the MSD assembly described in the present disclosure is not limited to large diameter filter casings. Smaller diameter embodiments of the MSD assembly may be used in groundwater monitoring wells, drilled groundwater supply wells, and other casings to serve multiple purposes.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

The present disclosure describes devices and methods for positioning and operating multipurpose casing devices (MCDs) in subsurface cylindrical casings for different purposes such as 1) sealing off the flow of fluids that may enter a casing from an elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned. MCDs may be applied, for example, in groundwater contamination assessments, groundwater resource investigations, or oil and gas exploration.

In at least one embodiment, a multipurpose casing device (MCD) includes: a layer of a flexible elastomeric element (referred to in the present disclosure as a rubber material) between two rigid plates that are detachably secured to each other wherein the layer of intervening rubber material has a greater diameter than that of the opposing two plates.

In at least one embodiment, the layer of rubber material has a diameter that is slightly larger than the inside diameter of the casing in which the MCD is to be positioned.

In at least one embodiment, an MCD has rubber material between three or more rigid plates that are detachably secured to each other wherein the intervening layer of rubber material has a greater diameter than that of the opposing three or more plates and slightly greater than the inside diameter of the casing in which the MCD is to be positioned.

In at least one embodiment, an MCD has a hole in the center of each rigid plate; the hole in the center of an upper plate and a lower plate of which is female threaded and is thicker than intervening plates that have no threads in the center hole.

In at least one embodiment, a layer of rubber material is on the outside of the top and the bottom plate and each layer has a diameter equal to that of the plates.

In at least one embodiment, an MCD has a hole in the center of each layer of rubber material matching the diameter of the hole in one or more adjoining plates.

In at least one embodiment, a relatively short segment of a hollow core cylindrical rod is attached by male threads to the female threaded hole in the center of an upper plate or a lower plate.

In at least one embodiment, the relatively short segment of a hollow core cylindrical rod contains a foot valve or similar device for preventing the backflow of fluids inside the rod, referred to in the present disclosure as a foot-valve sub.

In at least one embodiment, hollow core cylindrical rods of variable lengths (referred to in the present disclosure as extensions), have a male and a female threaded connection on each end, and a hole through each threaded connection for inserting quick-connect pins or similar devices to prevent unthreading.

In at least one example, an appropriately sized MCD is selected for a casing wherein the rubber material between adjoining plates is slightly larger than the inside diameter of the casing.

In at least one example, a foot-valve sub is attached to an appropriately sized MCD for the selected casing by removably connecting the male threaded end of the foot-valve sub to the female threads in either the top plate or the bottom plate of the MCD.

In at least one example, one end of an extension is attached to the foot-valve sub by connecting the male threaded end of the extension to the female threads in the top of the foot-valve sub and inserting a quick connect pin in the hole at the connection to prevent unthreading.

In at least one example, another extension is added to the first extension, if needed for reaching the designated elevation in a casing, and once the male threaded end of the second extension is connected to the female threads in the top of the first extension, a quick connect pin is inserted to prevent unthreading at the connection.

In at least one example, the above example is repeated as needed for obtaining an MCD of sufficient length to reach the designated elevation in a casing for the MCD assembly.

In at least one example, the rubber material of the MCD is lubricated with a pure fluid (such as deionized water) prior to installation for ease of compression in the casing.

In at least one example, an MCD assembly (defined herein as an MCD connected to a foot-valve sub, connected to one or more hollow core extensions, and secured by quick-connect pins) is compressed into the casing to the designated elevation and any fluid that may be entering the casing at a lower elevation will rise through the foot-valve sub and into the hollow-core extension(s) until equilibrium is reached with a fluid pressure outside the casing.

In at least one example, fluid within a hollow core extension can be measured (e.g., similar to measuring the hydrostatic head of groundwater in a piezometer) or sampled for chemical properties (e.g., similar to obtaining a groundwater sample from a monitoring well which represents groundwater quality from a discrete elevation).

In at least one example, an MCD is set at a designated elevation in a casing (using the foot-valve sub, hollow core extension[s], and quick-connect pins; these three components are referred to herein as the MCD stem assembly), and once the MCD stem assembly is detachably removed from the MCD by unthreading the MCD from the MCD stem assembly, a fluid-treatment cartridge is inserted in a casing and seated on top of the MCD at least until such time as the cartridge needs to be replaced based on the monitoring results.

In at least one example, a fluid-treatment cartridge is connected to an MSD stem assembly and inserted at a designated elevation in a casing using the MCD stem assembly and once the MCD stem assembly is detachably removed from the cartridge, the MCD stem assembly is reused to seat an MCD on top of the cartridge, at least until such time as the cartridge needs to be replaced based on the monitoring results.

In at least one example, the MCD is used to control fluid flow in a casing, whether the fluid is flowing upward or downward in the casing, directing the fluid to purposely flow within a fluid treatment cartridge and preventing the fluid from flowing through the annular space between the outside of the cartridge and inside walls of the casing.

In at least one example, an MCD assembly is used to surge fluids in a casing that has external openings (e.g., well screens, slots, louvers, or other openings exposed to an outside filter pack or natural formation material) that may periodically need to be cleaned (e.g., to remove fine particles, bacteria, or other materials that may clog or otherwise impede the flow of a fluid through the openings).

In at least one example, an MCD assembly is moved up and down a casing creating a surging action to remove materials in casing openings and thereby causing the materials to move upward with fluids through the foot-valve sub, hollow core extensions, and discharged above the ground surface.

In at least one example, an MCD assembly is withdrawn from a casing, dissembled, and the components are stored for a subsequent use in other casings where potential fluid contamination is not an issue.

In at least one example, an MCD assembly is withdrawn from a casing, the components are disassembled, decontaminated, and the MCD assembly is either dedicated for reuse in the same casing or potentially usable in other casings in the future.

In at least one example, an MCD is used, for example, at a hazardous waste site investigation, the MSD assembly is withdrawn from a casing, the components are disassembled and properly disposed of with other investigative derived waste or materials.

In at least one example, an MCD assembly is suitable for use in relatively large diameter filter casings (e.g., greater than 11 inches in diameter) such as those previously described and referenced in the prior art for: 1) sealing off the flow of fluids that may enter a casing from a known elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned.

The MCD assemblies described in the present disclosure could be reusable between casings; however, in situations where the fluid entering the casing is contaminated, the MCD assemblies may be dedicated to individual casings. Because the MSD assembly is a relatively simple tool it will be inexpensive to manufacture and could be disposed of if decontaminating between casings is impractical or if there is a concern due to potential trace-level contamination. Additional advantages of multipurpose casing devices are likely to be recognized beyond those described in the present disclosure and applications for other purposes are expected beyond those stated herein.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIGS. 8A through 8F are a sectional view of extensions added to foot-valve subs and quick-connect pins inserted to prevent unthreading of the extensions and a shackle for lifting the MCD assembly.

FIGS. 9A and 9B are an isometric and sectional view of one embodiment of a fluid treatment cartridge for integration with an MCD in a filter casing.

FIGS. 13A and 13B are a sectional view of an application showing two additional example sequential steps that could be followed for installation of an MCD in a filter casing.

DETAILED DESCRIPTIONS

Figure 1:
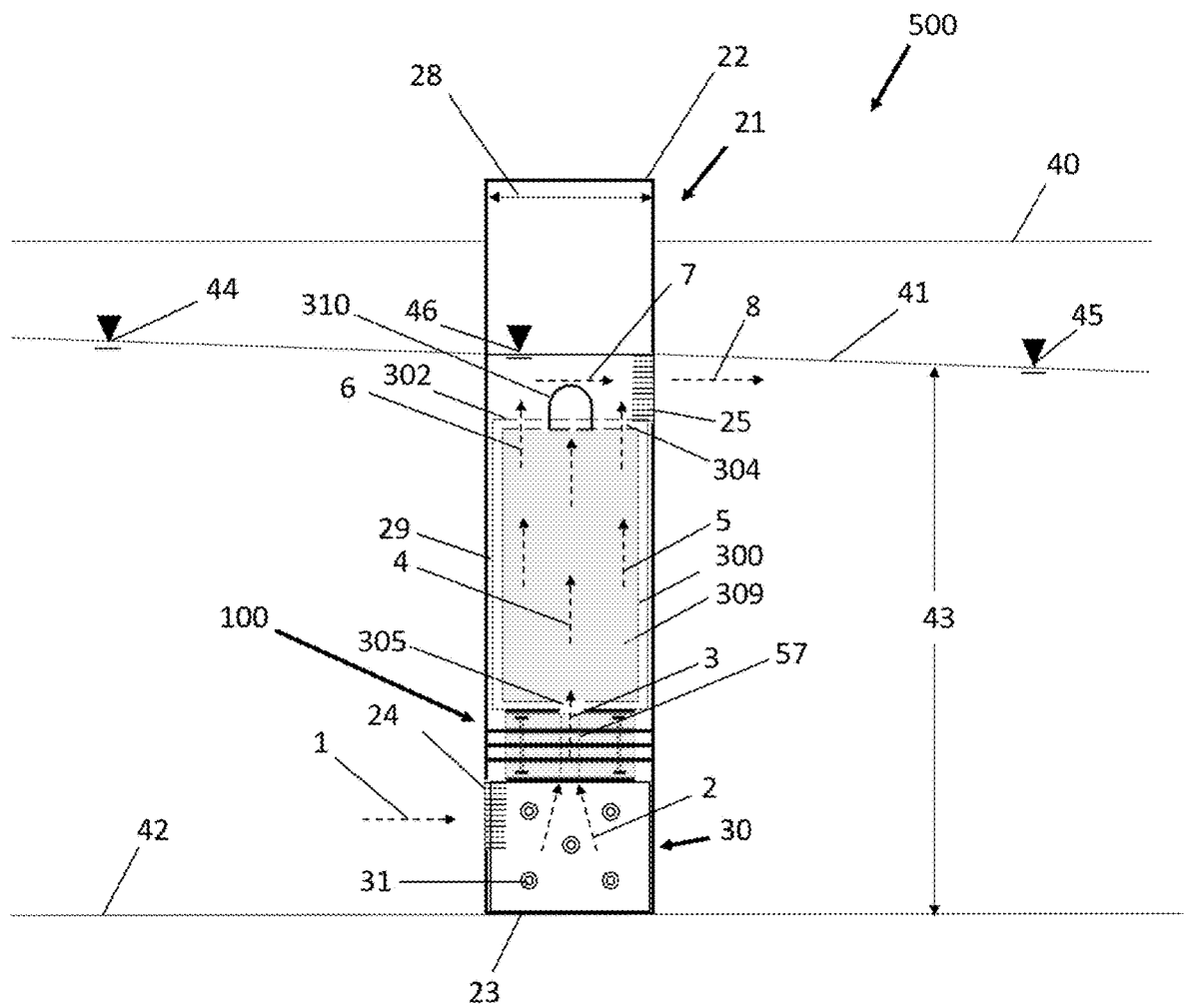
FIG. 1 is a side elevation view of an example subsurface application in which an MSD has been positioned at a lower elevation in a large diameter filter casing and used to control the upward flow of a fluid through a treatment cartridge seated on the MCD preventing the fluid from flowing through the annular space between the casing and cartridge.

These descriptions are presented with sufficient detail to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing. Although the drawings largely reference a vertical orientation of a casing, pipe, borehole, cartridge, or similar conduit (i.e., generally referred to the present disclosure as a casing), the inventive subject matters are not limited to a particular orientation of a casing (e.g., the devices in the present disclosure will also work in a horizontal or inclined casing).

FIG. 1 is a side elevation view of a subsurface application 500 in which a multipurpose casing device (MCD) 100 has been positioned in a casing 21 specifically to control fluid flow which in this example represents groundwater in an aquifer. A cylindrical casing 21 with a top 22, bottom 23, a lower elevation well screen 24 on one side of a casing 21, and an upper elevation screen 25 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a groundwater flow regime from left to right in FIG. 1.

In the example application 500 shown in FIG. 1, a casing 21 serves the same purpose as a filter casing or filter channel described in detail in the prior art (U.S. Pat. No. 9,937,537 B2 and U.S. Pat. No. 10,556,260 B2), in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 1, is detachably secured to both sides of a casing 21 (perpendicular to the illustration) with a purpose of diverting groundwater to flow preferentially toward a casing 21. In the example application 500 shown in FIG. 1, groundwater, as an example, flows into a lower elevation inlet screen 24 and moves generally upward through a casing 21 before discharging through a higher elevation outlet screen 25 (due to differences in hydraulic head resulting from the connection of a casing 21 to a barrier wall, not shown). An MCD has been placed in a lower elevation of the casing 21 to control the flow of flow of groundwater as indicated by dashed arrows 1 through 8 referencing different points along a groundwater flow path. Groundwater is generally flowing from points 1 to 8 in this example, which are referred to herein as flow arrows intended to illustrate the general direction of fluid flow.

Specifically, in the example 500 shown in FIG. 1, contaminated groundwater, as an example, laterally enters a casing 21 shown by flow arrow 1 through a lower elevation inlet screen 24 and flows into a permeable spacer 30 with holes 31 to the center of an MCD 100 shown by converging upward flow arrows 2. Groundwater flows upward in a center hole of the MCD 100 shown by flow arrow 3 into a central hole 305 in the bottom of a fluid treatment cartridge 300 and then flows upward shown by flow arrows 4 and 5 inside the cartridge 300 where contaminated groundwater contacts treatment media 309 inside the cartridge 300. Treated groundwater exits a plurality of holes 304 in a top 302 of a cartridge 300 shown by parallel flow arrows 6. Groundwater then flows horizontally as shown by flow arrow 7 before discharging 8 through a higher elevation outlet screen 25 on the downgradient side 45 of the filter casing 21. The details of devices and methods associated with the MCD 100 are described in the following figures and specifications.

Figure 2:
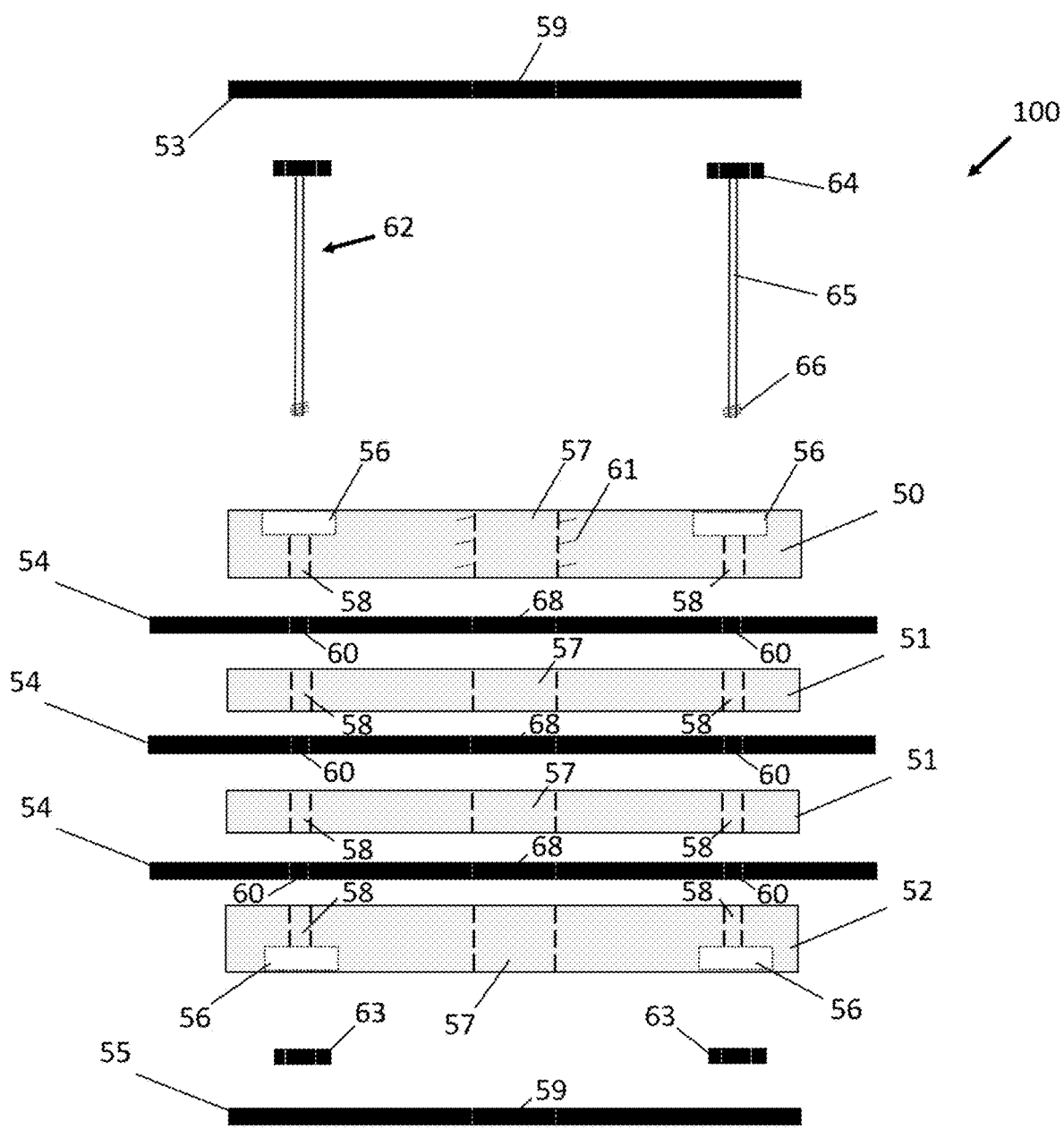
FIG. 2 is a side elevation view through one embodiment of an MCD showing components before assembly.

FIG. 2 is a side elevation view through one embodiment of an MCD showing components before assembly. In this preferred embodiment, an MCD consists of an upper plate 50, two intervening plates 51, and a lower plate 52 wherein the plates are rigid relative to three intervening layers 54 of a flexible rubber material. A flexible rubber material 53 is also shown above the upper plate 50 and below 55 the lower plate 52 with the same diameter as the respective plates. The three intervening layers 54 of a flexible rubber material are shown to extend beyond the edges of the adjoining rigid plates 50, 51, and 52 and have diameters that are slightly larger than the inside diameter of a casing (not shown) in which the MCD assembly is to be tightly placed for sealing purposes.

The upper plate 50 and lower plate 52 shown in FIG. 2 have recessed holes 56 to house bolt heads 64 and nuts 63, respectively. Holes 58 to accommodate bolt 62 shanks 65 and threads 66 extend through the plates 58 and rubber material 60. A central hole 57 in the upper plate 50 is tapered (i.e., National Pipe Thread or NPT) female threaded 61. Central holes 57 in the two intervening plates 51 are not threaded but have the same diameter as the central holes in the upper 50 and lower 52 plates. Central holes 59 are also shown in the rubber material 53 above the upper plate 50 and below 55 the lower plate 52.

Figure 3:
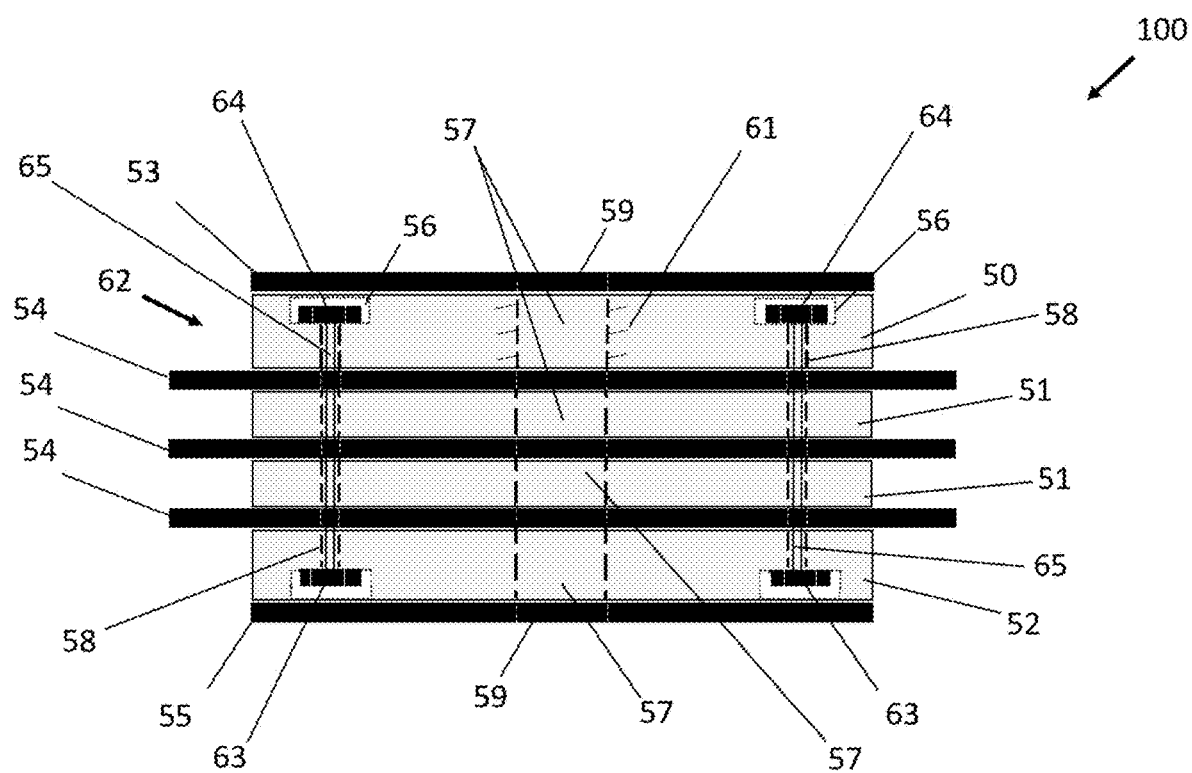
FIG. 3 is a side elevation view through an assembled MCD, in one embodiment.

FIG. 3 is a side elevation view through an assembled MCD 100, in one embodiment. Bolts 62 and nuts 63 detachably secure the upper plate 50, two intervening plates 51, and lower plate 52 and compress the intervening layers 54 of rubber material. Central holes 57 are shown through all the rigid plates the upper plate 50 of which is female threaded 61. Central holes 59 are also shown in the rubber material 53 above the upper plate 50 and below 55 the lower plate 52, and as previously shown in FIG. 2, central holes 68 are also in the three intervening layers of rubber material 54.

Figure 4:
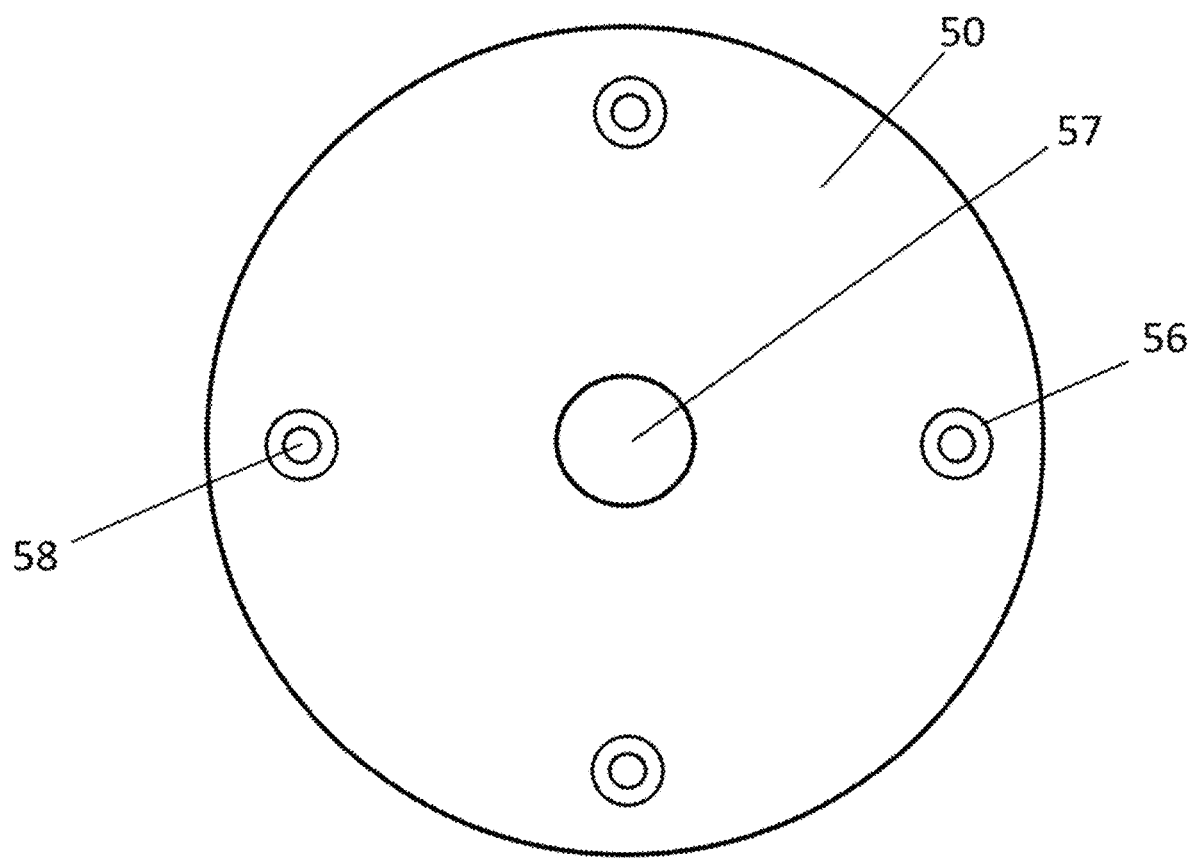
FIG. 4 is an overhead view of a top plate of an MCD before assembly, at the same relative scale shown in FIG. 3.

FIG. 4 is an overhead view of a top plate 50 of an MCD before assembly, at the same relative scale shown in FIG. 3. A central hole 57 in the upper plate 50 is shown (female threading 61 was previously shown in FIG. 2). Recessed holes 56 to house bolt heads 64 (previously shown in FIG. 3) and holes 58 to accommodate bolts 62 (previously shown in FIG. 2) are shown in FIG. 4.

Figure 5:
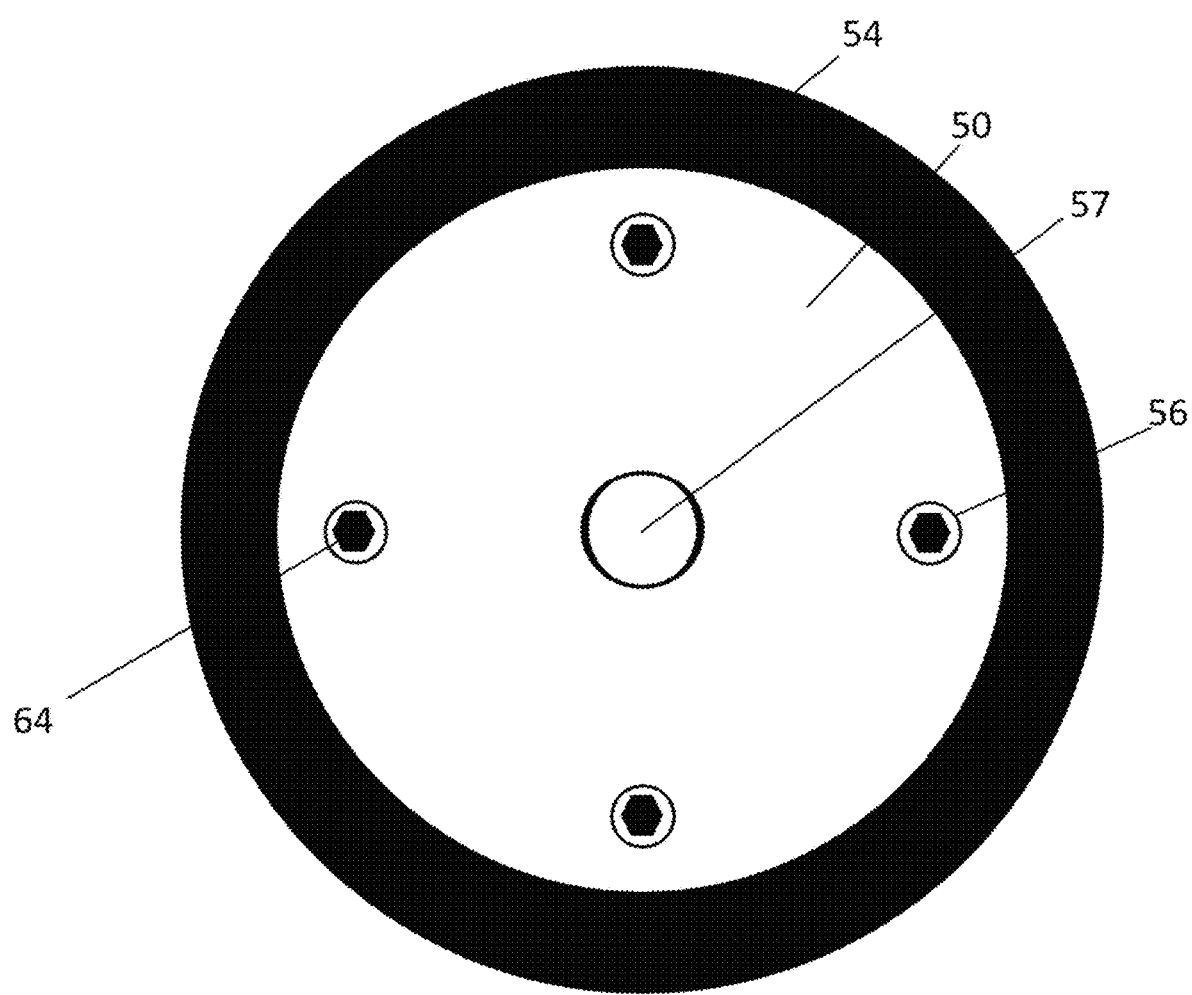
FIG. 5 is an overhead view of a top plate showing an extended rubber material beyond the plate diameter, at the same relative scale shown in FIG. 3 and FIG. 4.

FIG. 5 is an overhead view of a top plate 50 showing an extended rubber material 54 beyond the plate diameter, at the same relative scale shown in FIG. 3 and FIG. 4. A central hole 57 in the upper plate 50 is shown (female threading 61 was previously shown in FIG. 2). Recessed holes 56 to house bolt heads 64 are shown.

Figures 6A, 6B, 6C, 6D:
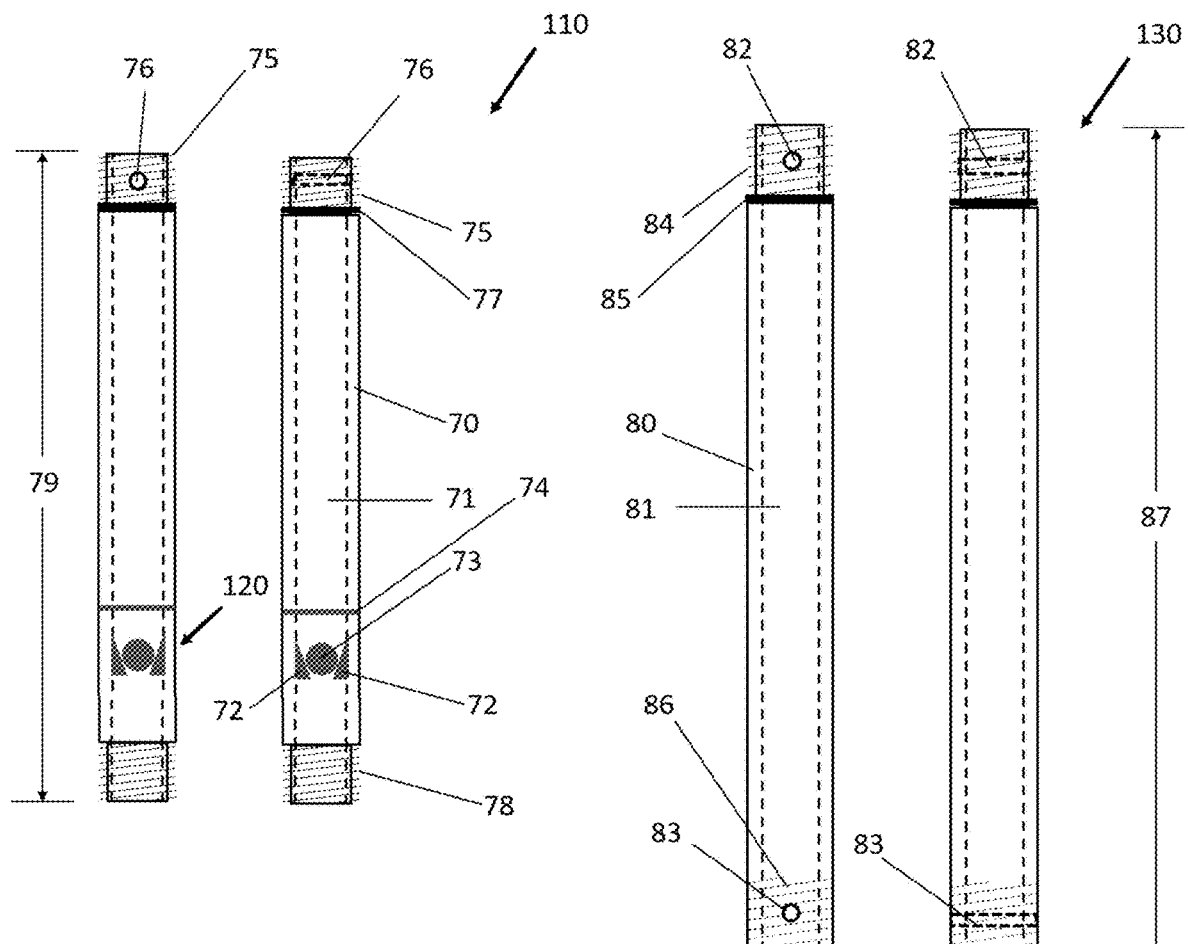
FIGS. 6A through 6D are a sectional view through foot-valve subs and extensions, in one embodiment, shown from different perspectives.

FIG. 6 is a sectional view through foot-valve subs 110 and extensions 130, in one embodiment, shown from different perspectives. Foot-valve subs 110 are relatively short 79 segments of pipe, tubing, or casing with foot valves 120 (FIG. 6A) or equivalent inside to prevent fluid from flowing out of the bottom of a foot-valve sub 110. FIG. 6B shows the external casing 70 which has a hollow core 71 with parallel male threading 75 at the top and tapered male threading 78 at the bottom. An O-ring seal 77 made of a rubber material or similar flexible material or equivalent seal or bonded washer is shown seated beneath the parallel male threads at the top of the foot-valve sub 110. A hole 76 is shown drilled perpendicularly through the parallel male threading 75 connection in the top of the foot-valve sub 110 in FIG. 6A and in FIG. 6B at a 90-degree rotation for a different perspective of the hole 76. The details of the foot-valve shown in FIG. 6B include a wedge-shaped valve 72 and a ball 73 that seats inside the wedge-shaped valve, and a washer 74 that serves as a stop to the ball 73 in one embodiment.

FIG. 6C and FIG. 6D show extensions 130, in one embodiment, shown from different perspectives. Extensions 130 may be of variable length but longer 87 than the length 79 of a foot-valve sub 110, as shown in comparison of FIG. 6D and FIG. 6A, respectively. FIG. 6C shows the casing 80 which has a hollow core 81 with male threading 84 at the top and female threading 86 at the bottom. A hole 82 is shown in the top of the extension 130 in FIG. 6C and in FIG. 6D at a 90-degree rotation for a different perspective. An O-ring seal 85 made of a rubber material or similar flexible material is shown seated beneath the male threads at the top of the extension 130. A hole 83 is also shown in the female threading 86 connection in the bottom of the extension in FIG. 6C and FIG. 6D.

Figure 7A:
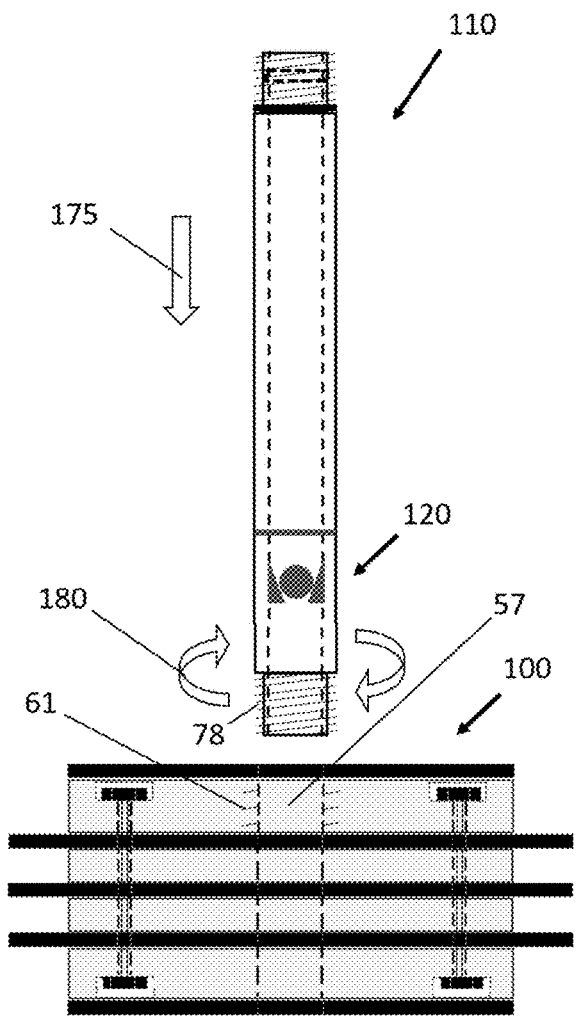
FIGS. 7A and 7B are a sectional view of foot-valve subs before and after integration with an MCD.
Figure 7B:
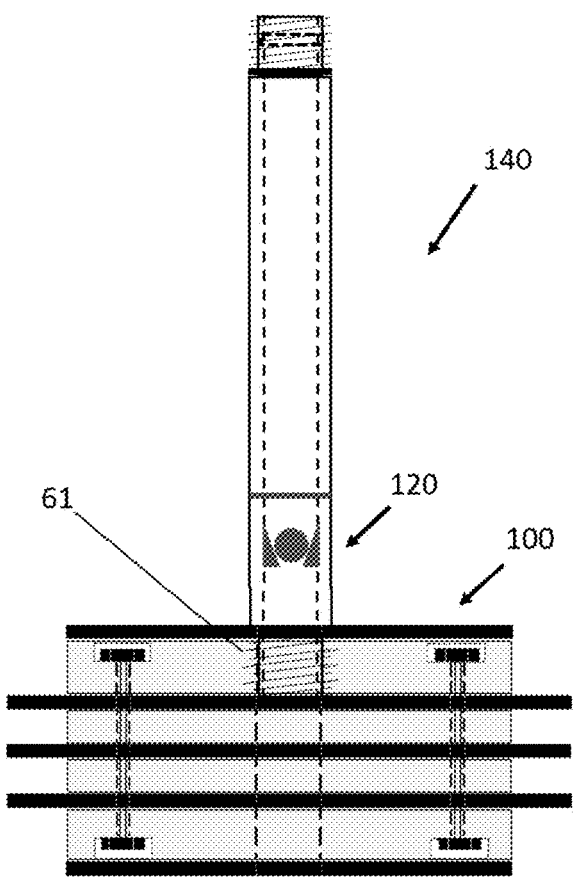

FIG. 7 is a sectional view of foot-valve subs 110 before (FIG. 7A) and after (FIG. 7B) integration with a fully assembled MCD 100. In FIG. 7A the foot-valve sub 110 is shown being lowered 175 and turned 180 clockwise to tighten male threads 78 at the bottom of the foot-valve sub 110 into the female threads 61 in the upper hole 57 of the MCD 100. The resulting assembly 140 in FIG. 7B shows the foot-valve sub 110 removably detached to a fully assembled MCD 100.

FIG. 8 is a sectional view of extensions 130 added to foot-valve subs 110 connected to MCDs 100 with sealable quick-connect pins 150 inserted in holes in threaded connections to prevent unthreading of the extensions, and a shackle 195 in an uppermost extension for lifting the entire MCD assembly 160. In FIG. 8A the extension 130 is being lowered 175 and turned in a clockwise direction 180 to tighten female threads 86 in the bottom of the extension 130 with the male threads 75 in the top of the foot-valve sub 110 thereby tightening the O-ring seal 77 (or equivalent seal or bonded washer) at the top of the foot-valve sub 110 and aligning hole 83 in the bottom threaded connection of the extension 130 with hole 77 in the top threaded connection of the foot-valve sub 110 for insertion of a quick-connect pin 150 as shown connected in FIG. 8B. A quick-connect pin 150 shown in FIG. 8C consists of a pin, locking loop 152, and rubber seals 154 such that when operated, as represented by FIG. 8D, and in place, shown in FIGS. 8B and 8F, the connections to extensions will not come unthreaded until locking loop 152 is unlatched. An entire MCD assembly 160 is shown in FIG. 8B and FIG. 8C when one or more extensions, respectively, are connected to a foot-valve sub, connections are held by a quick-connect pins, and the MCD is detachably secured to the foot-valve sub.

A shackle 195 or equivalent can be used as one alternative to lift and lower an entire MCD assembly 160 as shown in FIG. 8F, particularly if the MCD assembly 160 is of considerable length. In the example shown in FIG. 8E, the shackle 195 consists of a looped shackle 196 and a removable pin 198 with male threads on one end 199 and a thumb-screw head 195 on the other end of the pin 198. The pin 198 of the shackle 195 can be removed entirely and when the looped shackle 196 is in position over a male threaded connection of an extension 130, the pin 198 can be inserted through the unthreaded ear of the shackle (not shown), through the hole 82 in the male threaded connection of an extension 130 and tightened in the female threads in the opposing ear of the shackle (not shown).

FIG. 9 is an isometric and sectional view of one embodiment of a fluid treatment cartridge 200 for integration with an MCD in a filter casing (shown in subsequent figures). FIG. 9A is an isometric view of a cylindrically shaped fluid treatment cartridge 200 for use with an MCD in a filter casing which in one embodiment consists of sidewalls 201, a top 202, and a bottom 203 that is perforated with a plurality of holes 204. A hole 205 is shown in a top 82. A section line A-A' is labeled in FIG. 9A and the corresponding cross-sectional view along the center of cylindrically shaped fluid treatment cartridge 200 is shown in FIG. 9B.

A treatment media 209 is shown inside a cartridge 200 in FIG. 9B (the media is not specified within the present disclosure). External sidewalls 201, a top 202, and a bottom 203 with a plurality of holes 204 are shown. Female threads 210 are shown in the hole 205 in the top 202 of the cartridge 200 in FIG. 9B.

Figure 10A:
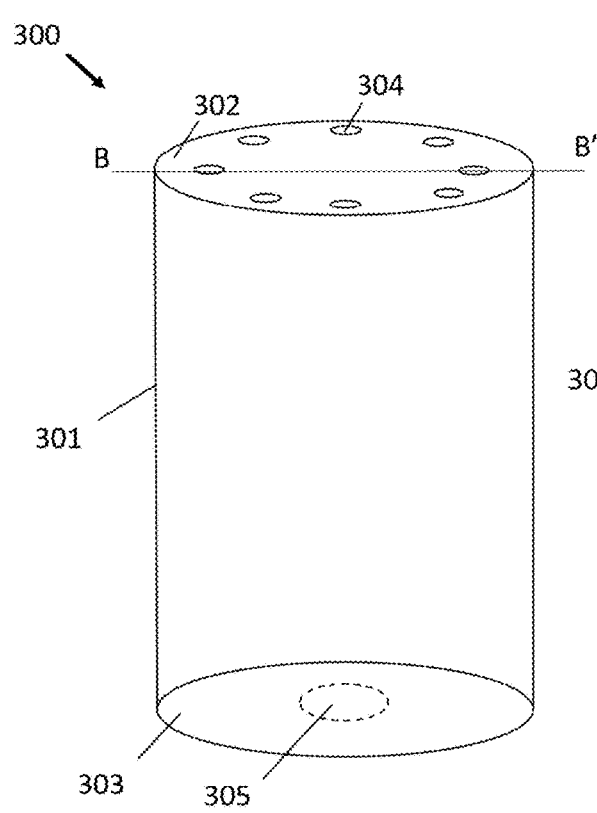
FIGS. 10A and 10B are an isometric and sectional view of a second embodiment of a fluid treatment cartridge for integration with an MCD in a filter casing.
Figure 10B:
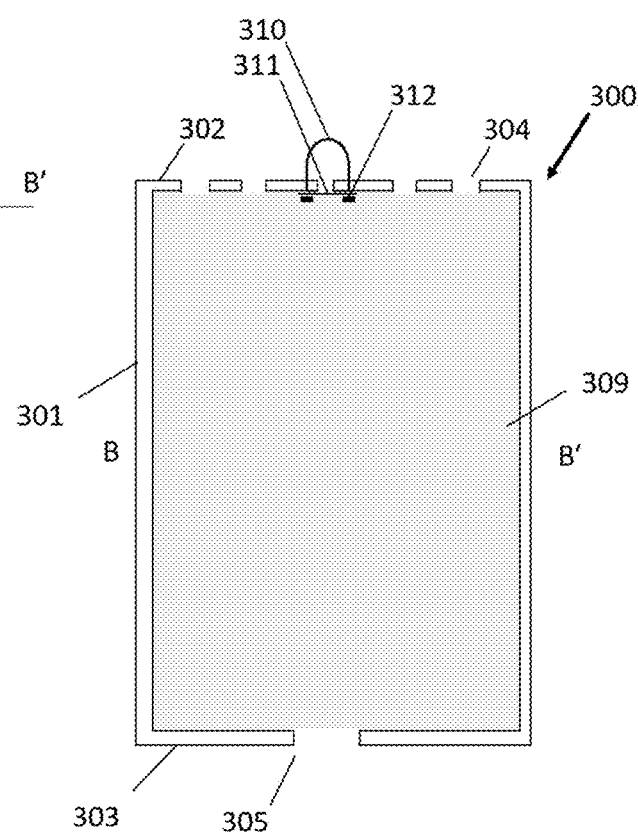

FIG. 10 is an isometric and sectional view of a second embodiment of a fluid treatment cartridge 300 for integration with an MCD in a filter casing (shown in subsequent figures). FIG. 10A is an isometric view of a cylindrically shaped fluid treatment cartridge 300 for use with an MCD in a filter casing which in one embodiment consists of sidewalls 301, a top 302 that is perforated with a plurality of holes 204, and a bottom 303. A hole 305 is shown in a bottom 303. A section line B-B' is labeled in FIG. 10A and the corresponding cross-sectional view along the center of cylindrically shaped fluid treatment cartridge 300 is shown in FIG. 10B.

A treatment media 309 is shown inside a cartridge 300 in FIG. 10B (the media is not specified within the present disclosure). External sidewalls 301, a top 302 with a plurality of holes 304, and a bottom 303 are shown.

Figure 11A:
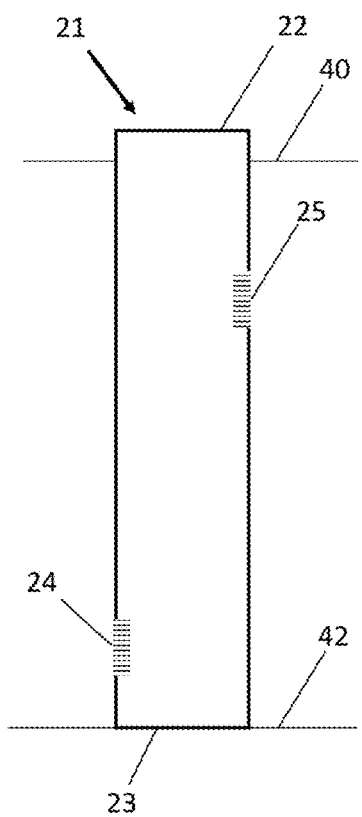
FIGS. 11A through 11C are a sectional view of an application showing three example sequential steps that could be followed for installation of an MCD in a filter casing.

FIG. 11 is a sectional view of an application 400 showing three example sequential steps that could be followed for installation of an MCD in a filter casing 21. FIG. 11A shows a cylindrical casing 21 with a top 22, bottom 23, a lower elevation well screen 24 on one side of a casing 21, and an upper elevation screen 25 on an opposing side of a casing 21. A casing 21 is installed below a ground surface 40 where an open bottom 23 is seated into a layer 42 at a lower elevation than a ground surface 40. In other applications (not shown), a casing bottom may be closed or have a drive shoe.

Figure 11B:
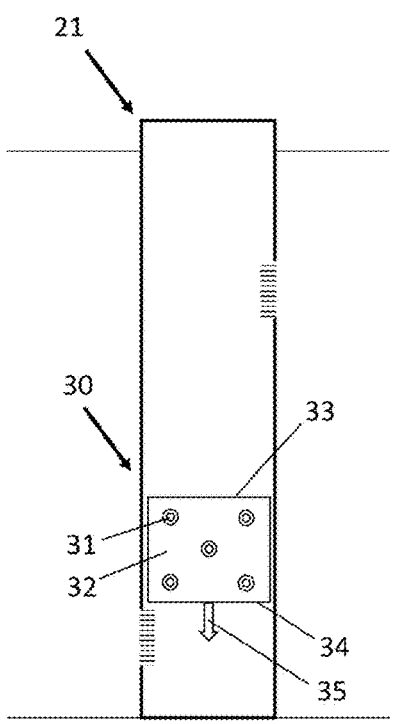

FIG. 11B shows a removable permeable spacer 30 being lowered into a casing 21 previously described in FIG. 30A as shown by a downward arrow 35. In one embodiment a spacer has perforations 31 in cylindrical walls 32. Perforations (not shown) are also in a top 33 and a bottom 34 in this embodiment of a removable permeable spacer 30. In other applications (not shown), a spacer may be as simple as a permeable aggregate added to the bottom of a casing.

Figure 11C:
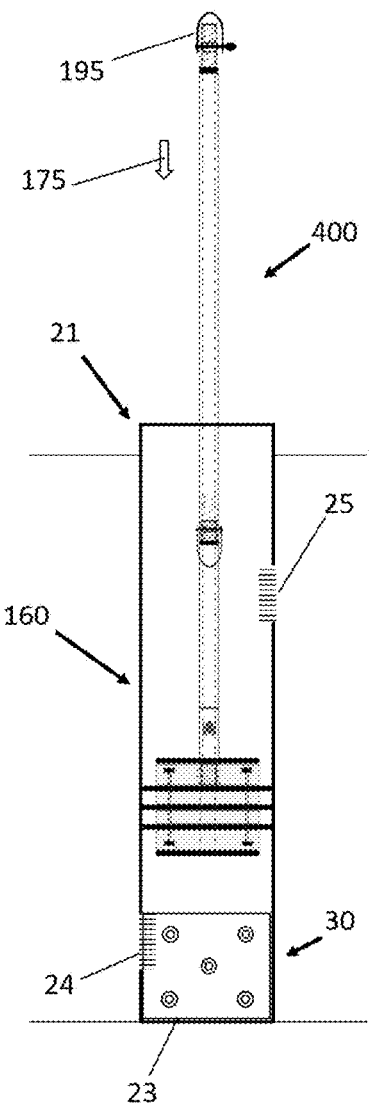

FIG. 11C shows a removable permeable spacer 30 in position at a desired elevation in the bottom 23 of a casing 21 aligning with a lower elevation well screen 24. An MCD assembly 160 is being lowered into a casing 21 as shown by a downward arrow 175 by a shackle 195.

Figure 12A:
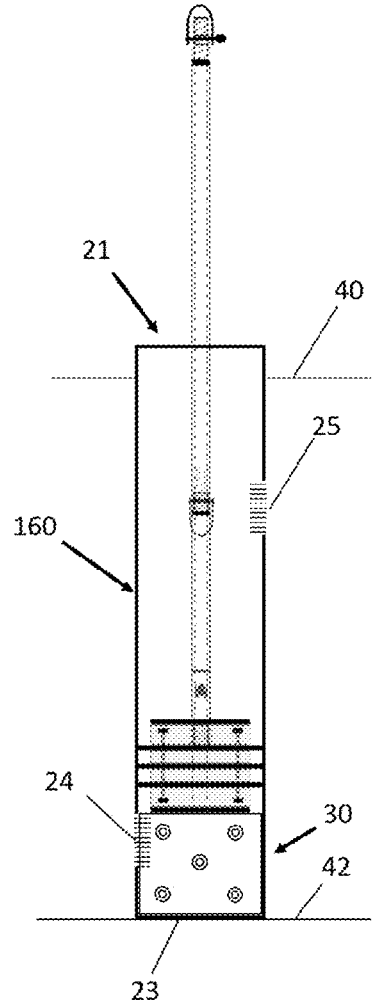
FIGS. 12A through 12C are a sectional view of an application showing three additional example sequential steps that could be followed for installation and operation of an MCD in a filter casing.
Figure 12B:
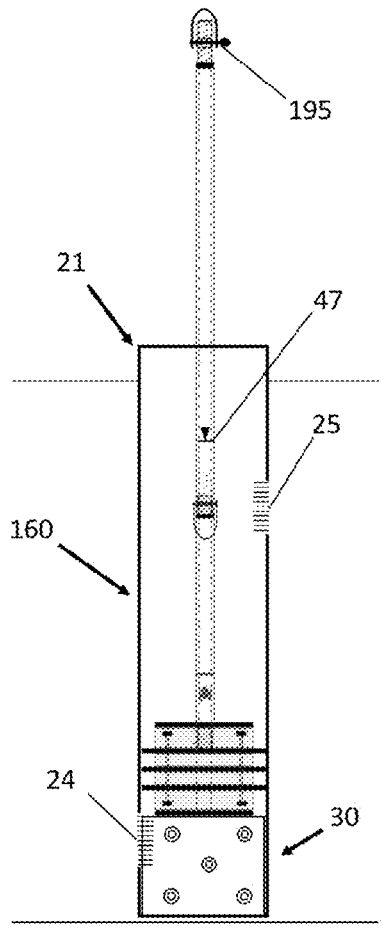
Figure 12C:
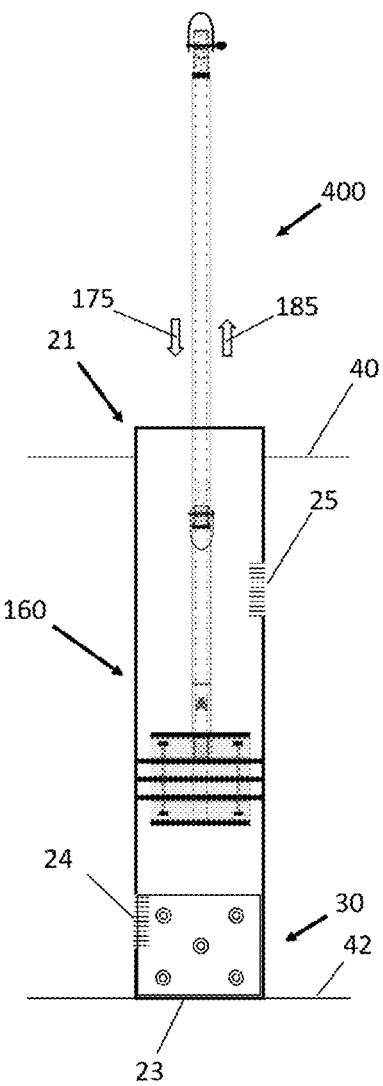

FIG. 12 is a sectional view of an application showing three additional example sequential steps from FIG. 11 that could be followed for installation and operation of an MCD assembly 160 in a filter casing 21. FIG. 12A shows an MCD assembly 160 seated on the top of a removable permeable spacer 30. FIG. 12B represents a hydraulic test where a groundwater level 47 is being measured inside an extension of a MCD assembly 160. FIG. 12C represents development of the filter casing 21 where the MCD assembly 160 is being raised 185 and lowered 175 in the casing to surge fluids and other materials from screens 24 or screens 25.

FIG. 13 is a sectional view of an application showing two additional example sequential steps from FIG. 12 that could be followed for installation of an MCD assembly 160 in a filter casing 21. FIG. 13A shows repositioning of the MCD assembly 160 on the removable permeable spacer 30 following development of the casing 21 from FIG. 12C. FIG. 13B shows removal of an MCD stem assembly 170 by counterclockwise rotation 190 of the MCD stem assembly 170 detachably removing the MCD stem assembly 170 from the MCD 100 which remains seated on top of the removable permeable spacer 30.

Figure 14:
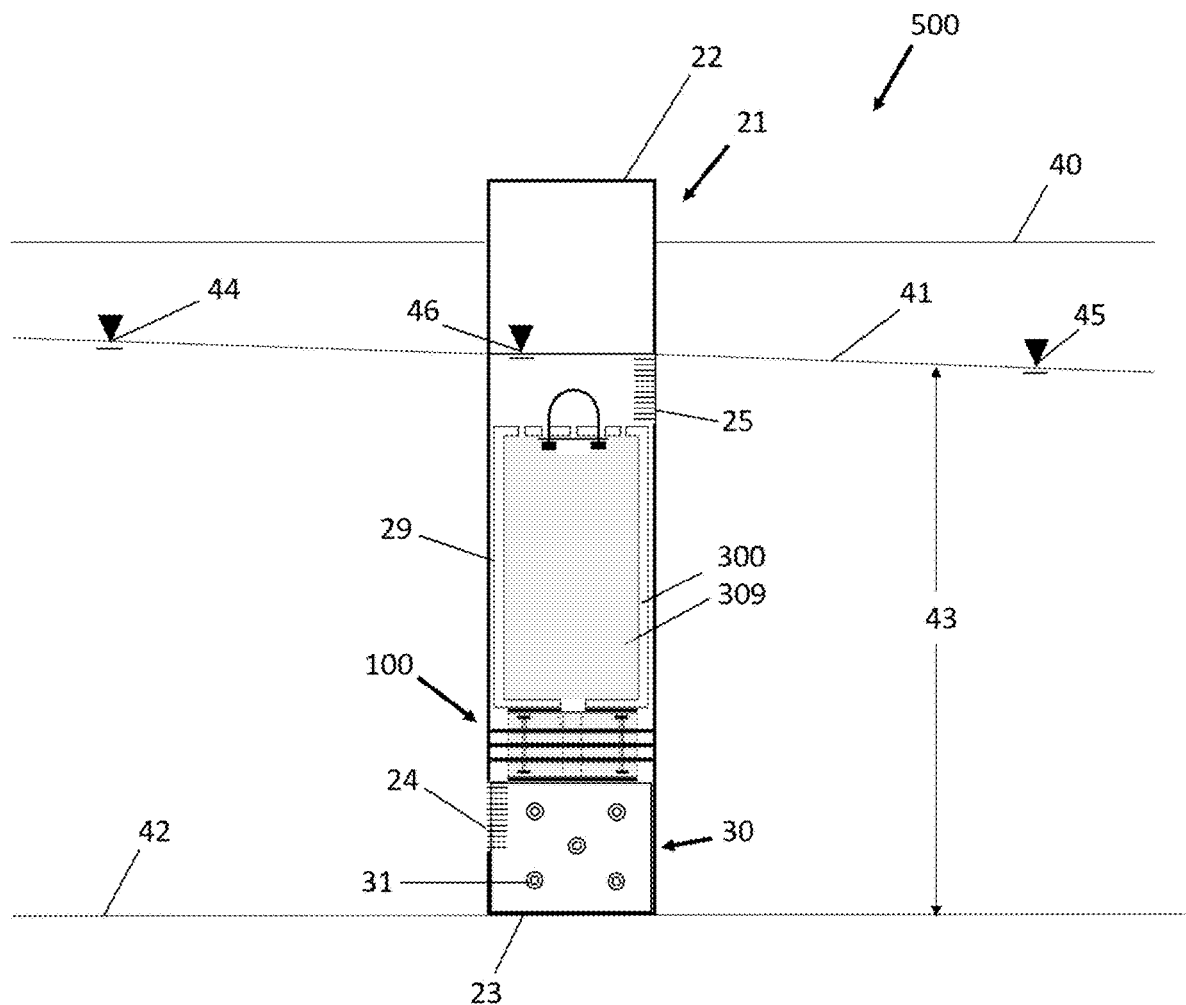
FIG. 14 is a sectional view of an application in an example hydrogeological setting building upon the prior sequential steps shown in FIG. 11 through FIG. 13, where a fluid treatment cartridge is added to a filter casing and seated on top of a previously installed MCD.

FIG. 14 is a sectional view of an application 500 in an example hydrogeological setting building upon the prior sequential steps shown in FIG. 11 through FIG. 13, where a fluid treatment cartridge 300 with a permeable treatment media 309 (not specified is added to a filter casing 21 and seated on top of a previously installed MCD 100 seated on a removable permeable spacer 30. A cylindrical casing 21 with a top 22, bottom 23, a lower elevation well screen 24 on one side of a casing 21, and an upper elevation screen 25 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a groundwater flow regime from left to right in FIG. 14.

In the example application 500 shown in FIG. 14, a casing 21 serves the same purpose as a filter casing or filter channel described in detail in the prior art (U.S. Pat. Nos. 9,937,537 B2 and 10,556,260 B2), in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 14, is detachably secured to both sides of a casing 21 (perpendicular to the illustration) with a purpose of diverting groundwater to flow preferentially toward a casing 21. In the example application 500 shown in FIG. 14, groundwater, as an example, flows into a lower elevation inlet screen 24 and moves generally upward through a casing 21 before discharging through a higher elevation outlet screen 25 (due to differences in hydraulic head resulting from the connection of a casing 21 to a barrier wall, not shown). An MCD has been placed in a lower elevation of the casing 21 to control the flow of flow of groundwater as indicated by dashed arrows shown in subsequent figures referencing different points along a groundwater flow path.

Figure 15:
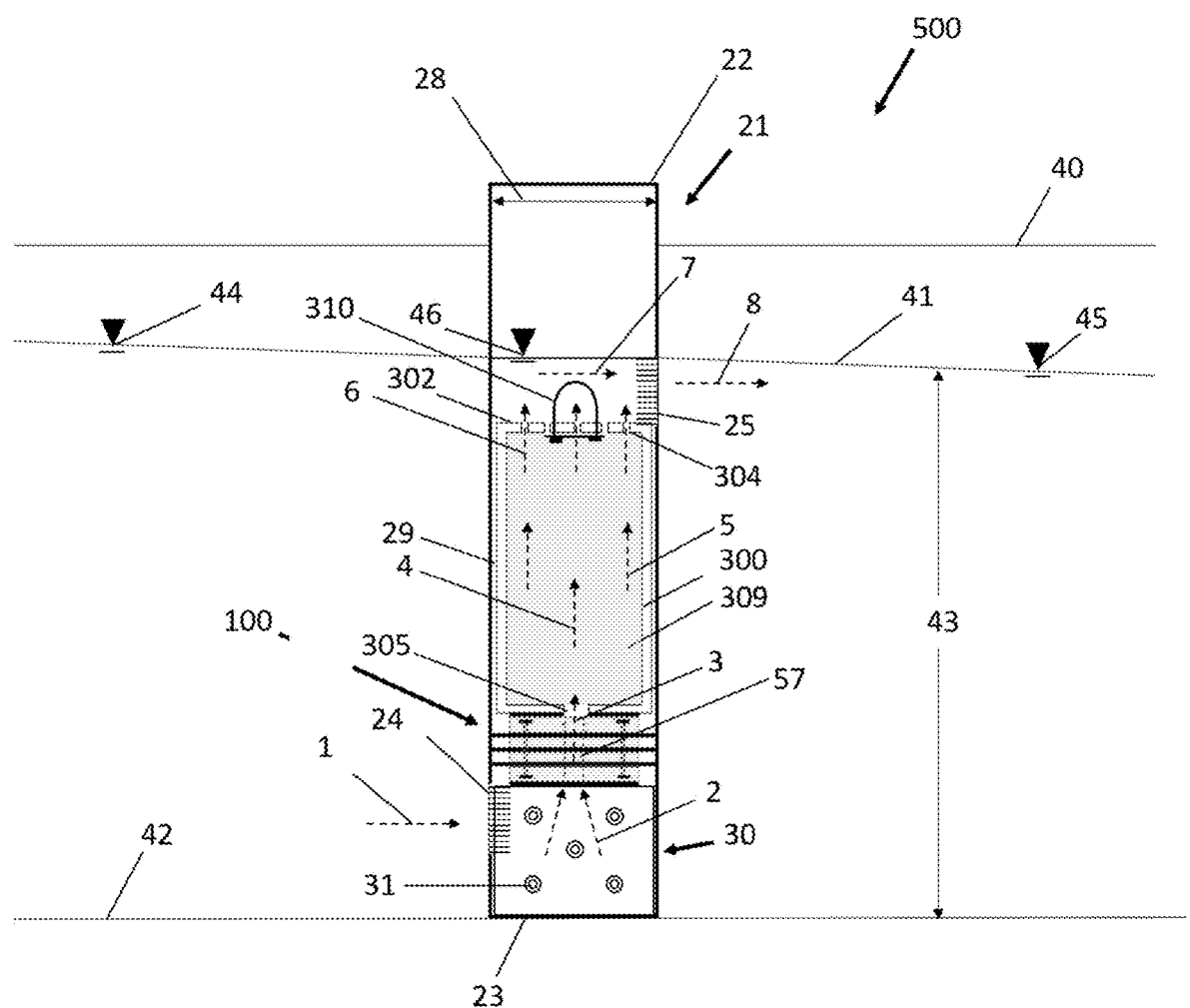
FIG. 15 is a side elevation view of an example subsurface application in which an MSD has been positioned at a lower elevation in a large diameter filter casing and used to control the upward flow of a fluid through a treatment cartridge seated on the MCD preventing the fluid from flowing through the annular space between the casing and cartridge as shown by fluid flow arrows.

FIG. 15 is a side elevation view of an example subsurface application 500 which is a continuation of FIG. 14 and in which an MSD 100 has been seated on a removable permeable spacer 30 at a lower elevation in a large diameter 28 filter casing 21 and used to control the upward flow of a fluid through a treatment cartridge seated on the MCD preventing the fluid from flowing through the annular space between the casing and cartridge as indicated by dashed arrows referencing different points along a groundwater flow path (dashed arrows numbered 1 through 8).

Specifically, in the example 500 shown in FIG. 15, contaminated groundwater, as an example, laterally enters a casing 21 shown by flow arrow 1 through a lower elevation inlet screen 24 and flows into a permeable spacer 30 with holes 31 to the center of an MCD 100 shown by converging upward flow arrows 2. Groundwater flows upward in a center hole 57 of the MCD 100 shown by flow arrow 3 into a central hole 305 in the bottom of a fluid treatment cartridge 300 and then flows upward shown by flow arrows 4 and 5 inside the cartridge 300 where contaminated groundwater contacts unspecified treatment media 309 inside the cartridge 300. Treated groundwater exits a plurality of holes 304 in a top 302 of a cartridge 300 shown by parallel flow arrows 6. Groundwater then flows horizontally as shown by flow arrow 7 before discharging 8 through a higher elevation outlet screen 25 on the downgradient side 45 of the filter casing 21.

Figure 16:
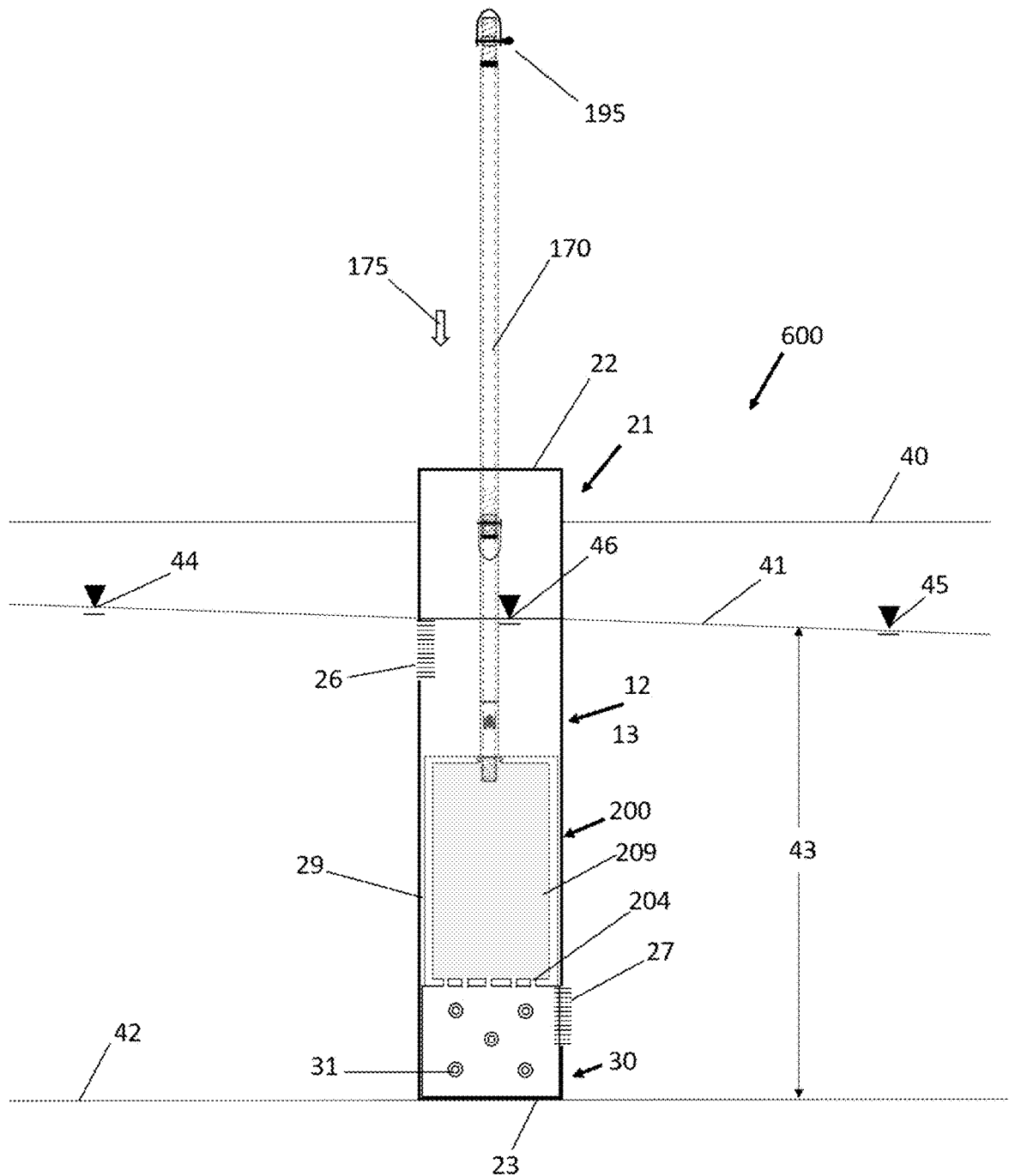
FIG. 16 is a sectional view of a filter casing installed in a different orientation (i.e., intake screens are positioned near the water table and outlet screens are positioned near the base of the aquifer), but in the same hydrogeologic setting shown in FIG. 14 through FIG. 15, where a fluid treatment cartridge is added at a designated elevation in a casing using an MCD stem assembly.

FIG. 16 is a sectional view of a filter casing 21 installed in a different orientation 600 (i.e., intake screens 26 are positioned near the water table 41 and outlet screens 27 are positioned near the base of the aquifer 42), but in the same hydrogeologic setting shown in FIG. 14 through FIG. 15. A fluid treatment cartridge 200 is added at a designated elevation in a casing 21 using an MCD stem assembly 170 removably attached to the fluid treatment cartridge 200 which has an unspecified permeable treatment media 209.

Figure 17:
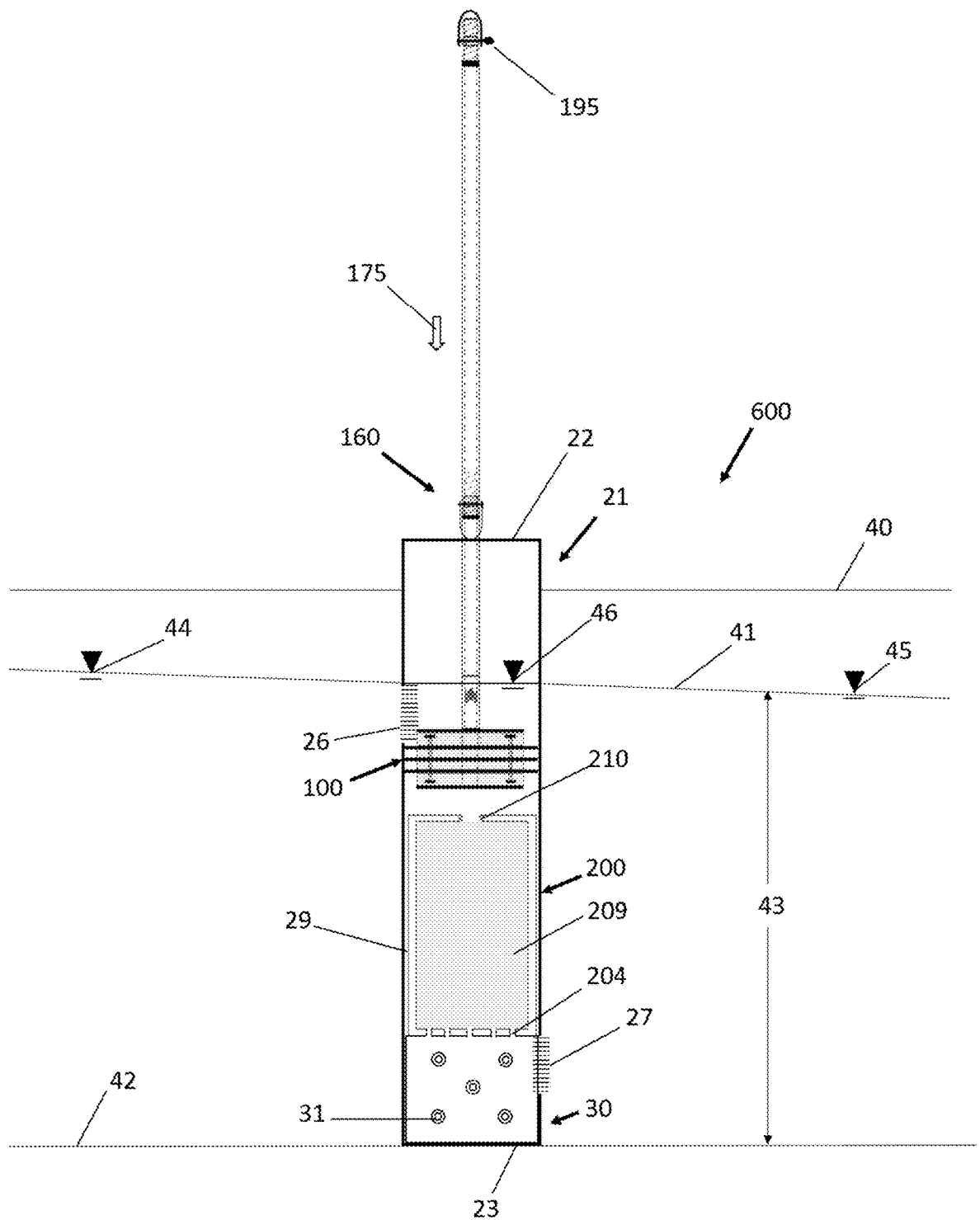
FIG. 17 is a sectional view of a filter casing installed in a different orientation (i.e., intake screens are positioned near the water table and outlet screens are positioned near the base of the aquifer), but in the same hydrogeologic setting shown in FIG. 14 through FIG. 16, where an MCD is seated on top of a fluid treatment cartridge at a designated elevation in a casing using the MCD stem assembly.

FIG. 17 is a sectional view of a filter casing 21 installed in a different orientation 600 (i.e., intake screens 26 are positioned near the water table 41 and outlet screens 27 are positioned near the base of the aquifer 42), but in the same hydrogeologic setting shown in FIG. 14 through FIG. 16, where an MCD assembly 160 is in the process of being lowered 175 into the casing 21 and the MCD 100 is to be seated on the top of a fluid treatment cartridge 200 at a designated elevation in a casing 21. A fluid treatment cartridge 200 is shown to have an unspecified permeable treatment media 209 in FIG. 17

Figure 18:
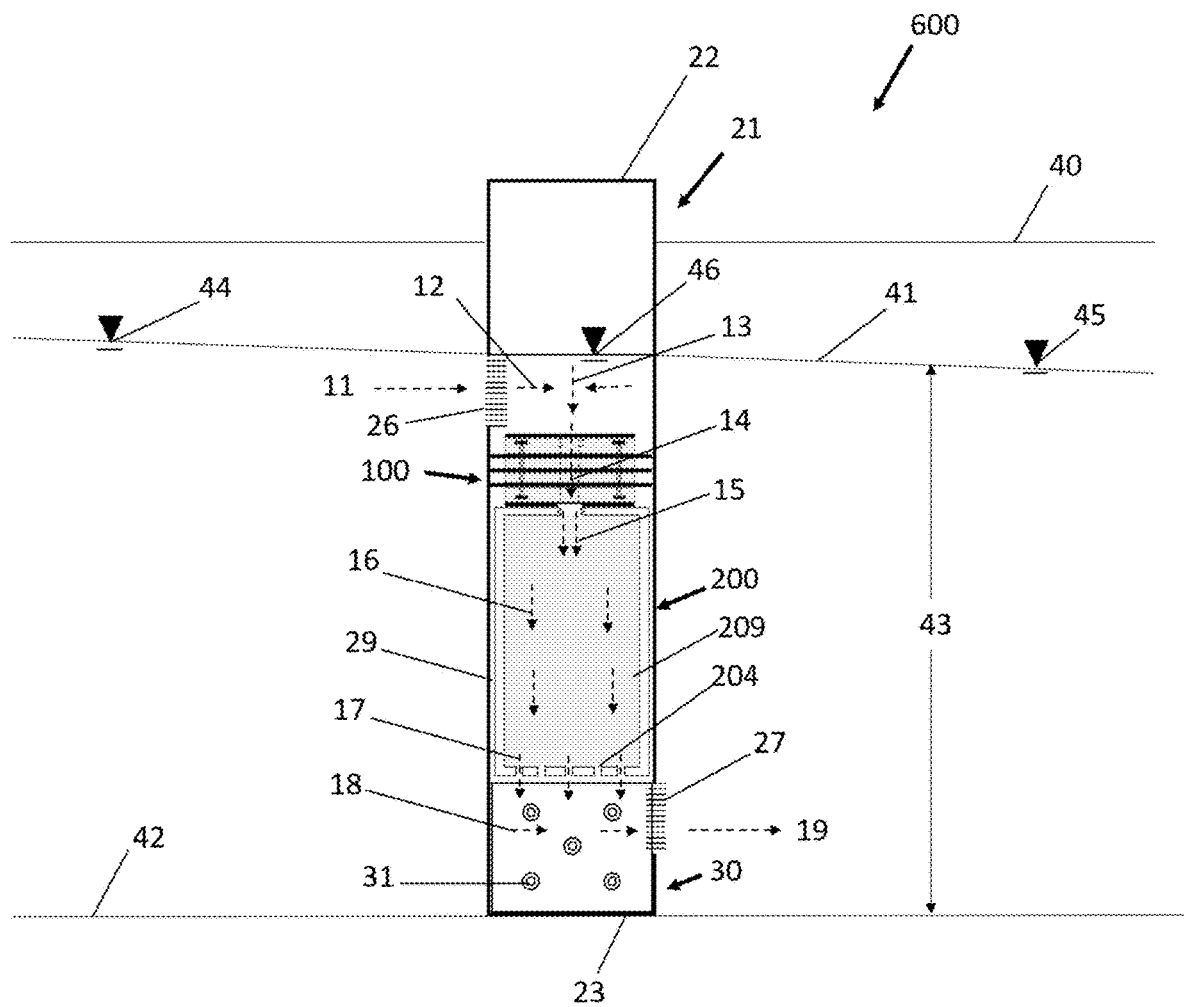
FIG. 18 is a sectional view of a filter casing installed in a different orientation (i.e., intake screens are positioned near the water table and outlet screens are positioned near the base of the aquifer), but in the same hydrogeologic setting shown in FIG. 14 through FIG. 17, where an MCD is seated on top of a fluid treatment cartridge at a designated elevation in a casing using the MCD stem assembly and used to control the downward flow of a fluid through an MCD preventing the fluid from flowing through the annular space between the casing and cartridge.

FIG. 18 is a sectional view of a filter casing 21 installed in a different orientation 600 (i.e., intake screens 26 are positioned near the water table 41 and outlet screens 27 are positioned near the base of the aquifer 42), but in the same hydrogeologic setting shown in FIG. 14 through FIG. 17, where an MCD 100 is seated on top of a fluid treatment cartridge at a designated elevation in a casing 21 and used to control the downward flow of a fluid through an MCD 100 preventing the fluid from flowing through the annular space 29 between the casing 21 and the cartridge 200.

Specifically, in the example 600 shown in FIG. 18, groundwater laterally enters a casing 21 as shown by flow arrow 11 through a higher elevation inlet screen 26 and flows laterally shown by flow arrows 12 before flowing vertically 13 downward into the hole throughout the center of the MCD 100 as shown by flow arrow 14. Groundwater continues to flow downward 15 through the fluid treatment cartridge 200 shown by parallel flow arrows 16 before discharging through the holes 204 in the bottom of the treatment cartridge 200 shown by flow arrows 17 into a permeable spacer 30 with holes 31 before discharging laterally 19 through a lower elevation outlet screen 27.

What is claimed is:

1. A multipurpose casing assembly comprising:
   an upper rigid-circular plate including a first central plate hole, wherein the first central plate hole includes a plurality of tapered threads;
   a lower rigid-circular plate including a second central plate hole;
   a first layer of rubber material, wherein the first layer of rubber material is positioned on a top of the upper rigid-circular plate, wherein the first layer of rubber further comprises a first central rubber hole aligned with the first central plate hole and the second central plate hole,
   a second layer of rubber material, wherein the second layer of rubber material is positioned on a bottom of the lower rigid-circular plate, wherein the second layer of flexible rubber material includes a second central rubber hole, wherein the second central rubber hole is aligned with the first central plate hole, the second central plate hole, and the first central rubber hole;
   a third layer of rubber material, wherein the third layer of rubber material is positioned between the upper rigid-circular plate and the lower rigid-circular plate, wherein the third layer of rubber material includes a third central rubber hole, wherein the third central rubber hole aligns with the first central plate hole, the second central plate hole, the first central rubber hole, and the second central rubber hole, wherein the third layer of rubber material has a slightly larger outside diameter than an inside diameter of a separate subsurface cylindrical casing in which the multipurpose casing device is positioned;
   a placement tool, wherein the placement tool comprises a hollow core cylindrical tool including a plurality of tapered male threads on a first end of the hollow core cylindrical tool for detachable securement to the plurality of tapered threads of the upper rigid-circular plate, wherein a second end of the hollow core cylindrical tool further comprises a plurality of male threads with an O-ring, wherein the hollow core cylindrical tool further comprises an internal foot valve, wherein the internal foot valve prevents a backflow of a fluid inside the hollow core cylindrical tool; and
   a cylindrical cartridge including media for treatment of a contaminated fluid forming a fluid-treatment cartridge, wherein the fluid-treatment cartridge is positioned on top of the multipurpose casing device, wherein the multipurpose casing device and the fluid-treatment cartridge are in fluid communication with the subsurface cylindrical casing, wherein the subsurface cylindrical casing includes an inlet screen and an outlet screen, wherein the multipurpose casing device and the fluid-treatment cartridge receives fluid from the inlet screen and the fluid treatment media contacts the fluid as the fluid flows from the inlet screen to the outlet screen, wherein the inlet screen is at a lower elevation than the outlet screen.

2. The multipurpose casing device of claim 1, wherein the placement tool further comprises a plurality of hollow core cylindrical rods, wherein each hollow core cylindrical rod of the plurality of hollow core cylindrical rods includes a plurality of female threads on a first end, wherein the plurality of female threads of the plurality of hollow core cylindrical rods attaches to the plurality of tapered male threads on the second end of the hollow core cylindrical tool, wherein a second end of each hollow core cylindrical rod of the plurality of hollow core cylindrical rods includes a plurality of male threads with an O-ring, wherein the plurality of male threads of each hollow core cylindrical rod of the plurality of hollow core cylindrical rods attaches to the plurality of female threads of another hollow core cylindrical rod of the plurality of hollow core cylindrical rods.

3. The multipurpose casing device of claim 2 further comprising a first thread locking hole perpendicularly positioned at a top of the placement tool, a second thread locking hole positioned at a bottom of each hollow core cylindrical rod of the plurality of hollow core cylindrical rods, and a third thread locking hole at a top of each hollow core cylindrical rod of the plurality of hollow core cylindrical rods, wherein the first thread locking hole is operable to receive a shackle pin, wherein the shackle pin is operable to lift and/or lower the multipurpose casing device, the hollow core cylindrical tool, and/or the plurality of cylindrical rods relating to the subsurface cylindrical casing.

4. The multipurpose casing device of claim 2, wherein the placement tool further comprises a first thread locking hole perpendicularly positioned through the plurality of male threads of the hollow core cylindrical tool, a second thread locking hole perpendicularly positioned through the plurality of female threads of at least one hollow core cylindrical rod of the plurality of hollow core cylindrical rods, wherein the second thread locking hole aligns with the first thread locking hole, wherein the placement tool further comprises a third thread locking hole perpendicularly positioned through the plurality of male threads of each hollow core cylindrical rod of the plurality of hollow core cylindrical rods, a fourth thread locking hole perpendicularly positioned through the plurality of female threads of each hollow core cylindrical rod of the plurality of hollow core cylindrical rods, wherein the third thread locking hole aligns with the fourth thread locking hole, wherein the placement tool further comprises a detachable pin with a locking loop, wherein the detachable pin has a smaller outside diameter than the first thread locking hole, the second thread locking hole, the third thread locking hole, and the fourth thread locking hole, wherein the detachable pin has a first detachable rubber-type seal on a first end of the detachable pin that adjoins one side of a hollow core cylindrical rod of the plurality of hollow core cylindrical rods and a second detachable rubber-type seal on a second end of the detachable pin that adjoins an opposing side of the hollow core cylindrical rod of the plurality of hollow core cylindrical rods, wherein the locking loop secures the first detachable rubber-type seal and the second detachable rubber-type seal against an outside of the plurality of hollow core cylindrical rods, wherein the detachable pin engages with one or more hollow core cylindrical rods of the plurality of hollow core cylindrical rods to prevent disengagement by unthreading, wherein the placement tool is sealed from fluid leakage by the O-ring on the plurality of male threads on the upper end of each hollow core cylindrical rod of the plurality of hollow core cylindrical rods and the first detachable rubber-type seal and the second detachable rubber seal against an outside of the plurality of hollow core cylindrical rods, and wherein the placement tool further comprises a detachable looped lifting shackle with a removable shackle pin, wherein, the removable shackle pin has a smaller outside diameter than the first thread locking hole, the second thread locking hole, the third thread locking hole, and the fourth thread locking hole.

5. The multipurpose casing device of claim 1, further comprising a plurality of plates positioned between the upper rigid-circular plate and the lower rigid-circular plate, wherein the plurality of plates are detachably secured to each other, wherein each plate of the plurality of plates includes a layer of flexible rubber material on the top of the plate.

6. The multipurpose casing device of claim 5, wherein each plate of the plurality of plates includes a central plate hole, wherein each central plate hole of the plurality of plates aligns with the first central plate hole, the second central plate hole, the first central rubber hole, the second central rubber hole, and the third central rubber hole.

* * * * *